UNITED STATES PATENT OFFICE.

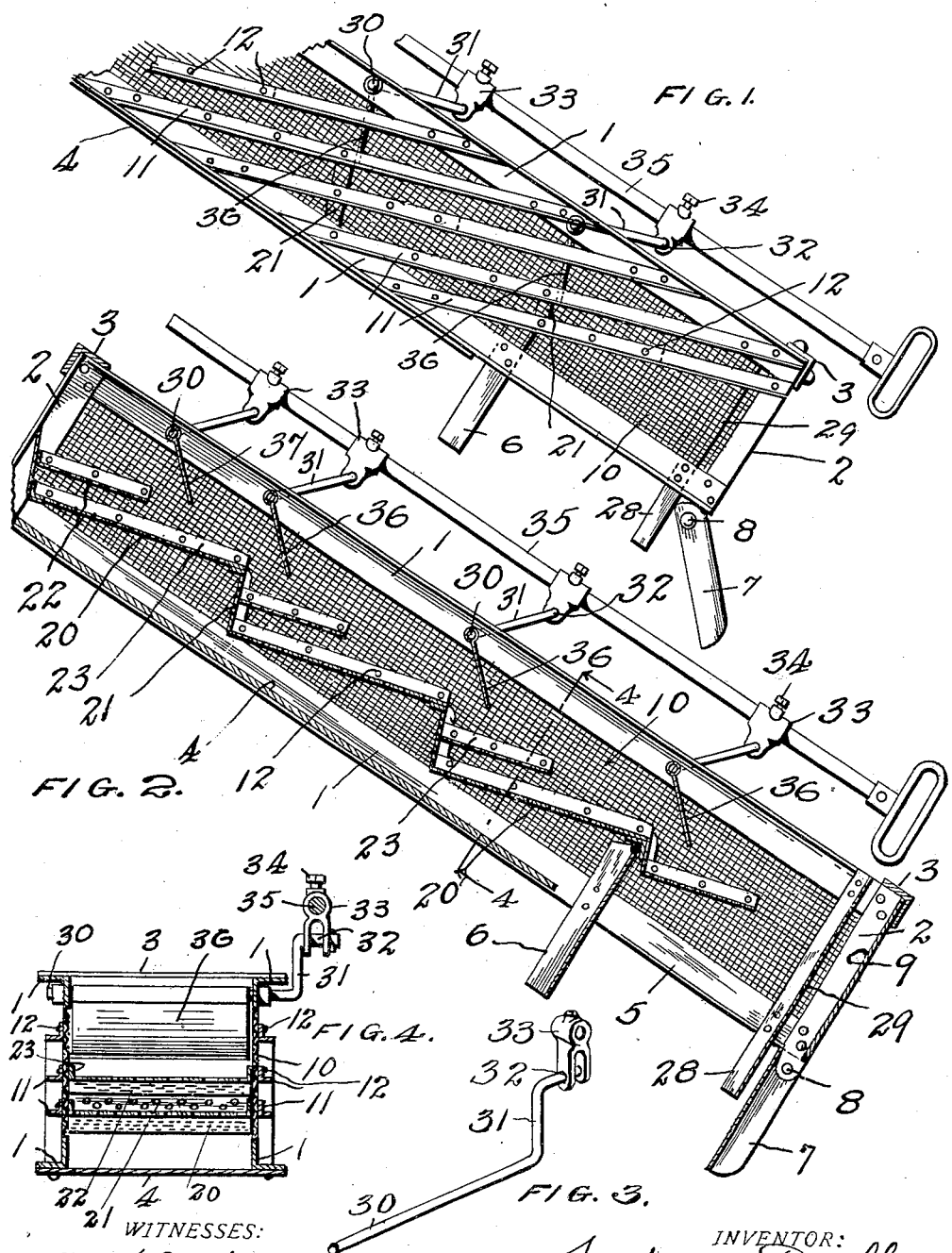

ANDREW DILL, OF RANTOUL, ILLINOIS.

GRAIN CLEANER AND DRIER.

No. 923,498.  Specification of Letters Patent.  Patented June 1, 1909.

Application filed January 23, 1909. Serial No. 473,797.

*To all whom it may concern:*

Be it known that I, ANDREW DILL, a citizen of the United States, and resident of Rantoul, Champaign county, State of Illinois, have invented certain new and useful Improvements in Grain Cleaners and Driers; and my preferred manner of carrying out the invention is set forth in the following full, clear, and exact description, terminating with a claim particularly specifying the novelty.

This invention relates to screens and riddles, ordinarily employed in connection with threshing machines, and the object of the same is to produce a combined grain cleaner and drier which performs its work by gravity alone and thus does not require the attachment of power.

To this end the invention consists broadly in an open framework located in an inclined position on the outside of the elevator, a series of steps located therein and each consisting of two riddles of different length and different size mesh, adjustable gates for controlling the flow of material over said steps, and a peculiar form of outlet for the grain and screenings; and the invention consists specifically in certain details of construction for carrying out this general idea, all as described below and as shown in the accompanying drawings wherein—

Figure 1 is a side elevation of this device partly broken away; Fig. 2 is a longitudinal section with the gates and the outlet chute set in a different position from that shown in Fig. 1; Fig. 3 is a detail of the gate operating mechanism; Fig. 4 is a cross section on the line 4—4 of Fig. 2.

Referring to the drawings, the framework of this device comprises four bars or sills 1, preferably of L-iron as shown in Fig. 1, connected at their corners by upright posts 2, and the uppermost sills connected at their ends by cross bars 3; and 4 is a solid flooring secured beneath the lowermost sills and extending from their upper ends for about three quarters of their length so as to leave a grain outlet 5 between the lower sills at their lower ends. 6 is a substantially upright plate mounted between these sills just below the lower end of the flooring and just above the outlet 5, whereby dirt and screenings passing down said flooring will be directed away from the grain outlet.

7 is a chute pivoted at 8 to the lower ends of the lower posts 2 so that it may be set at the desired angle. Said posts are connected by a solid lower end plate 9 against which strike the dirt and screenings passing down the device, whence they fall downward into the upper end of the chute 7 if it be disposed as shown in Fig. 1, and are thence deflected away from the outlet 5. This chute may be turned on its pivot 8 to the position shown in Fig. 2, or to any point intermediate these two positions, if desired, for the purpose of enabling the operator to direct the grain into different bins.

The bottom of the framework is closed by the floor 4, its top is open, and over its sides are placed sheets of wire netting 10 of such mesh as will permit a free circulation of air and the exit of dust but will prevent the lateral loss of grain. By preference said netting is held in place by strips 11 of L-iron located obliquely across the frame on lines paralleling the planes of the screens to be described below, with their extremities secured to the upper and lower sills; and said screens may be conveniently attached to these strips by rivets or bolts 12 passing through them and through the intervening netting. The presence of these strips gives rigidity to the entire framework, while also holding the netting in place and affording convenient supports for the screens—yet there is little or no obstruction to the free passage of air by which the grain is to be dried during its course through the device.

Within the framework is located a series of steps each consisting of two screens of different length and mesh, with risers between the steps. The lower and longer screens or treads 20 and the risers 21 connecting the lower end of one such screen with the upper end of the next below, are of fine mesh (about 7/32 of an inch) so as to permit the passage of dirt and fine chaff but prevent the passage of grain; and the upper and shorter screens 22 are of larger mesh (say one inch) so as to permit the passage of grain but prevent the passage of large pieces of chaff. These screens extend from a riser 21 for a portion of the length of the lower screen 20 above and parallel with it, and a suitable distance over it, say from 6 to 12 inches. All screens may be strengthened along their edges by frame bars 23 which are secured to the strips 11 through the netting by bolts or rivets 12 as above described. Across the lower end of the framework and spaced a slight distance from the end plate 9 is an upright screen 29 of fine mesh whose lower extremity 28 by preference extends downward between the lower sills 1 at the lower side of the grain outlet 5, and when the chute 7 is turned to an angle as shown in Fig. 1 its upper edge strikes this screen and receives everything which passes through the latter and falls between it and the plate 9. The bodies of the screens may be of any approved material, and I do not wish to be confined to the dimensions or distances herein set forth.

Pivotally mounted through the upper sills 1 are rock shafts 30 each having one end cranked as at 31 and pivoted at 32 to a block 33 adjustably mounted by a set screw 34 on a longitudinal rod 35 which extends through all said blocks, so that movement of said rod simultaneously turns all the cranks. Between the sills each shaft carries a gate 36, which gates are adapted to close against the lower ends of the lower screens 20, and by preference one of the shafts carries an additional gate 37 adapted to close against the lower end of the uppermost or first of the upper or coarser screens 22. Thus it will be seen that when the rod 35 is moved longitudinally the cranks and shafts cause the swinging of said gates so that the free edges of the latter are set nearer to or farther from the lower edges of the screens mentioned, whereby delivery of material from the latter may be checked, more or less retarded, or freely permitted. Moreover, by means of the set screws 34 the exact position of any block upon the rod can be adjusted so that its gate may be swung through a different path than the others if the exigencies of the case will make it desirable.

I have not considered it necessary to illustrate and describe the supports for this device nor the other machines such as the thresher and the elevator with which it is to be used, but I propose to erect it on the outside of the elevator in the open air so that air can pass freely through it from side to side and into its top and upper end—thus economizing space within the elevator and thresher and adapting this device to use with machines of various types as now constructed. The device is to be set at whatever angle seems best adapted for its purposes, preferably about 45° to the horizontal so that the screens will stand at from 30° to 35° to the horizontal. The grain and chaff is delivered into the upper end of the device in any suitable manner and onto the uppermost coarse screen 22 through which falls everything but the coarser particles, while the grain is caught by the subjacent finer screen 20 and the fine chaff and dirt falls through the latter onto the floor 4. Passing thence downward by gravity as rapidly as permitted by the setting of the gates 36 and 37, the operation is repeated on the pair of screens comprising the next step, and so on to the lowermost step, through which the grain falls out the outlet 5; and if the inertia is sufficient to carry the grain over against the upright screen 29, its impact there will drive through it the remaining particles of dirt which are taken out by the chute 7, while all other dirt falls on the floor 4 and is taken out by the plate 6. The angle of the entire framework can be adjusted according to prevailing conditions such as the moisture which the material possesses, its specific gravity, and the direction and velocity of the prevailing wind, and obviously the adjustability of the gates will also be useful to the end that the speed of the material through the device can be accurately regulated to produce the best results. It will be obvious, therefore, that this device is a combined grain cleaner and drier—a cleaner because it separates from the grain the chaff and dirt, and a drier because while doing so it permits the free circulation of air which dries the grain finally delivered through the outlet 5.

What is claimed as new is:

1. A gravity grain cleaner comprising a series of stationary steps whereof the treads and risers are of fine mesh screening and the treads are inclined downward from a horizontal, and a shorter and coarser screen fixed above the tread and extending from the riser over the upper end of each fine screen.

2. A grain cleaner and drier comprising a fixed oblique framework having open sides and top and closed bottom with a grain outlet at its lower end, a series of fixed steps secured obliquely within the framework but also inclined downward from the horizontal, each step comprising a plurality of screens of different mesh, and gates adapted to be adjustably set at the delivery ends of said steps.

3. A grain cleaner and drier comprising a fixed oblique framework having open sides covered with netting, open top, and closed bottom with a grain outlet at its lower end, and a series of fixed steps secured obliquely within the framework but also inclined downward from the horizontal, each step comprising a plurality of screens of different mesh, oblique strips connecting the top and bottom bars of the framework outside said netting parallel with said screens, and fastening devices passing through the strips and netting and engaging said screens.

4. A grain cleaner and drier comprising a fixed oblique framework of top and bottom sills connected by upright corner posts and cross bars and having an open top, sides of netting, and a closed bottom provided with a grain outlet at its lower end; and fixed oblique steps therein composed of fine screens forming the treads and risers and coarse screens spaced above said treads and extending from the risers over and throughout part of the length of the fine screens.

5. A grain cleaner and drier comprising a fixed oblique framework of top and bottom sills connected by upright corner posts and cross bars and having an open top, sides of netting, and a closed bottom provided with a grain outlet at its lower end; fixed oblique steps therein composed of fine screens forming the treads and risers and coarse screens spaced above said treads and extending from the risers over and throughout part of the length of the fine screens, the fine screen being omitted and the coarse one employed over the grain outlet, an upright fine screen within the framework beyond this coarse screen and directed to said grain outlet, a closed end plate beyond the upright screen, a chute at the lower end of said plate, and a fixed chute at the upper side of said outlet.

6. In a grain cleaner and drier, the combination with an oblique framework having sides of netting and a closed bottom provided with a grain outlet at its lower end, an upright plate at the upper side of said outlet directing the dirt from said bottom away from the cleaned grain, an upright plate at the lower end of the framework, and a chute at the lower end of this plate; of a series of inclined screens arranged in steps within said framework, rock shafts journaled through the upper bars of the latter and having cranked extremities, means for adjusting said extremities, and gates secured on the shafts and adapted to be adjustably set at the delivery ends of said steps.

7. In a grain cleaner and drier, the combination with an oblique framework having sides of netting and a closed bottom provided with a grain outlet at its lower end, an upright plate at the upper side of said outlet directing the dirt from said bottom away from the cleaned grain, an upright plate at the lower end of the framework, and a chute at the lower end of this plate; of a series of inclined screens arranged in steps within said framework, rock shafts journaled through the upper bars of the latter and having cranked extremities, blocks pivoted to said cranks and having set screws, a rod passing through all said blocks under their set screws, and gates secured on the shafts and adapted to be adjustably set at the delivery ends of said steps.

In testimony whereof I have hereunto subscribed my signature this the 20th day of January, A. D. 1909.

ANDREW DILL.

Witnesses:
  H. B. GOFF,
  L. F. LEDDERBOGE.